(12) United States Patent
Laudal et al.

(10) Patent No.: US 10,669,610 B2
(45) Date of Patent: Jun. 2, 2020

(54) RARE EARTH ELEMENT EXTRACTION FROM COAL

(71) Applicant: University of North Dakota, Grand Forks, ND (US)

(72) Inventors: Daniel Laudal, Grand Forks, ND (US); Steven Benson, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 372 days.

(21) Appl. No.: 15/462,164

(22) Filed: Mar. 17, 2017

(65) Prior Publication Data

US 2018/0265948 A1 Sep. 20, 2018

(51) Int. Cl.
 C22B 59/00 (2006.01)
 C22B 60/02 (2006.01)
 C22B 3/08 (2006.01)
 C22B 3/12 (2006.01)

(52) U.S. Cl.
 CPC ............... *C22B 59/00* (2013.01); *C22B 3/08* (2013.01); *C22B 3/12* (2013.01); *C22B 60/0234* (2013.01); *C22B 60/0291* (2013.01); Y02P 10/234 (2015.11)

(58) Field of Classification Search
 CPC .................................................... C22B 59/00
 See application file for complete search history.

(56) References Cited

U.S. PATENT DOCUMENTS

| | | | |
|---|---|---|---|
| 4,582,512 A | 4/1986 | Smit et al. | |
| 4,741,741 A | 5/1988 | Salem et al. | |
| 4,743,271 A | 5/1988 | Kindig et al. | |
| 4,753,033 A | 6/1988 | Kindig | |
| 4,804,390 A | 2/1989 | Lloyd et al. | |
| 5,087,350 A | 2/1992 | Paris-Marcano | |
| 6,156,281 A | 12/2000 | Akers et al. | |
| 7,981,835 B2 | 7/2011 | Srinvasachar et al. | |
| 2013/0287653 A1 | 10/2013 | Joshi et al. | |
| 2014/0373683 A1 | 12/2014 | Boudreault et al. | |
| 2015/0086449 A1 | 3/2015 | Sugita et al. | |

FOREIGN PATENT DOCUMENTS

| | | |
|---|---|---|
| JP | 2000313928 A | 11/2000 |
| JP | 2014218719 A | 11/2014 |
| WO | WO2016/011540 A1 | 1/2016 |

OTHER PUBLICATIONS

International Search Report and Written Opinion from PCT Application Serial No. PCT/US2018/022398, dated Jul. 3, 2018, 15 pages.

(Continued)

*Primary Examiner* — Melissa S Swain

(74) *Attorney, Agent, or Firm* — Kinney & Lange, P.A.

(57) ABSTRACT

A method includes contacting a coal feedstock with an acidic solution to form residual coal and a leachate. The method further includes separating the residual coal from the leachate where the leachate contains rare earth elements and where the residual coal has preserved organic content and reduced inorganic content. Another method includes contacting a coal feedstock with a basic solution to form residual coal and a leachate. The method further includes separating the residual coal from the leachate where the leachate contains rare earth elements.

20 Claims, 2 Drawing Sheets

(56) References Cited

OTHER PUBLICATIONS

R. B. Finkelman, et al., "Combustion and Leaching Behavior of Elements in the Argonne Premium Coal Samples", from Energy & Fuels, 1990, pp. 755-766.
K. M. Steel, et al., "The Production of Ultra Clean Coal by Chemical Demineralisation", from Fuel 80, 2001, pp. 2019-2023.
P. Balaz, et al., "Chemcial Treatment of Coal by Grinding and Aqueous Caustic Leaching", from Fuel 80, 2001, pp. 665-671.
M. Paul, et al., "Acid Leaching of Ash and Coal: Time Dependence and Trace Element Occurances", from Int. J. Miner. Process. 79, 2006, pp. 27-41.
W. Wang, et al., "Column Leaching of Coal and its Combustion Residues, Shizuishan, China", from Int'l Journal of Coal Geology 75, 2008, pp. 81-87.
B. Manoj, et al., "Chemical Leaching of Low Rank Coal and its Characterization Using SEM/EDAX and FTIR", from Journal of Mineral & Materials Characterization & Engineering, vol. 8, No. 10, 2009, pp. 821-832.
International Preliminary Report on Patentability for PCT Application Serial No. PCT/US2018/022398, dated Sep. 26, 2019, 10 pages.

RARE EARTH ELEMENT EXTRACTION FROM COAL

BACKGROUND

Rare earth elements (REE) are generally considered the fifteen lanthanides and scandium and yttrium. Rare earth elements (and compounds that contain them) have many current and potential future uses. Rare earth elements are used as catalysts in the production of glasses and in time-resolved fluorometry and fluorescence resonance energy transfer in drug discovery assays. Current research projects are also investigating the use of some REEs as anticancer agents. Due to their extreme magnetism, certain REEs have also found use in permanent magnets for wind turbines and in motors for hybrid/electric vehicles.

Rare earth elements are not actually rare, but rather fairly plentiful in the Earth's crust. However, REEs are generally dispersed and not typically found in high concentrations like some minerals and ores. They tend to occur together in nature and are generally difficult to separate from one another.

SUMMARY

A method includes contacting a coal feedstock with an acidic solution to form residual coal and a leachate. The method further includes separating the residual coal from the leachate where the leachate contains rare earth elements and where the residual coal has reduced inorganic content, but preserved organic content.

Another method includes contacting a coal feedstock with a basic solution to form residual coal and a leachate. The method further includes separating the residual coal from the leachate where the leachate contains rare earth elements.

DETAILED DESCRIPTION

The present disclosure describes methods and systems for separating rare earth elements (REEs) from low rank coal. Rare earth elements are non-destructively removed from the coal so that both the REEs and the coal can be further processed and utilized. Rare earth elements are extracted from coal by treating the coal with a dilute acidic solution or a dilute basic solution. The REEs are leached from the coal into the acidic or basic solution. The leachate can then be processed to concentrate, purify and/or separate individual REEs while the coal is dried and can be combusted or used as feedstock to create other products, such as activated carbon. By extracting the REEs from coal with the dilute acidic or basic solution, the REEs are not lost as tailings while the coal is also beneficiated.

Rare earth elements are a set of chemical elements that includes the fifteen lanthanides in addition to scandium and yttrium. Thus, the REEs include cerium, dysprosium, erbium, europium, gadolinium, holmium, lanthanum, lutetium, neodymium, praseodymium, promethium, samarium, scandium, terbium, thulium, ytterbium and yttrium. While relatively abundant, REEs are generally more difficult to mine and extract than other metals. This causes REEs to be more expensive than many other metals.

Some types of low rank coals contain relatively significant concentrations of REEs. Low rank coals include lignite (brown coal and leonardite) and sub-bituminous coal. Some coal beds and zones of low rank coal can contain REEs at a concentration of about 300 parts per million (ppm) or greater. For example, the Williston Basin underlies most of North Dakota, northwestern South Dakota, eastern Montana and southern Saskatchewan, Canada. The Hagel, Beulah and Zap coal zones are located in the east-central part of the Williston Basin. The Hansen and Harmon coal zones are located in the southwestern part of the Williston Basin. Each of these coal zones contains lignite and/or sub-bituminous coals that are typically enriched in REEs.

Coal feedstocks, including low rank coal, can be combusted to generate heat and energy or processed to produce other products, such as activated carbon. Unless REEs are extracted from coal before it is combusted or processed, the REEs can be irretrievably lost or made more difficult to recover. For instance, coal combustion fly ash and bottom ash/slag can be enriched with REEs due to removal of the organic content of the coal, but due to high combustion temperature, the REEs can become trapped in the glassy components in the ash-related materials, making separation extremely difficult or costly.

Figure 1:
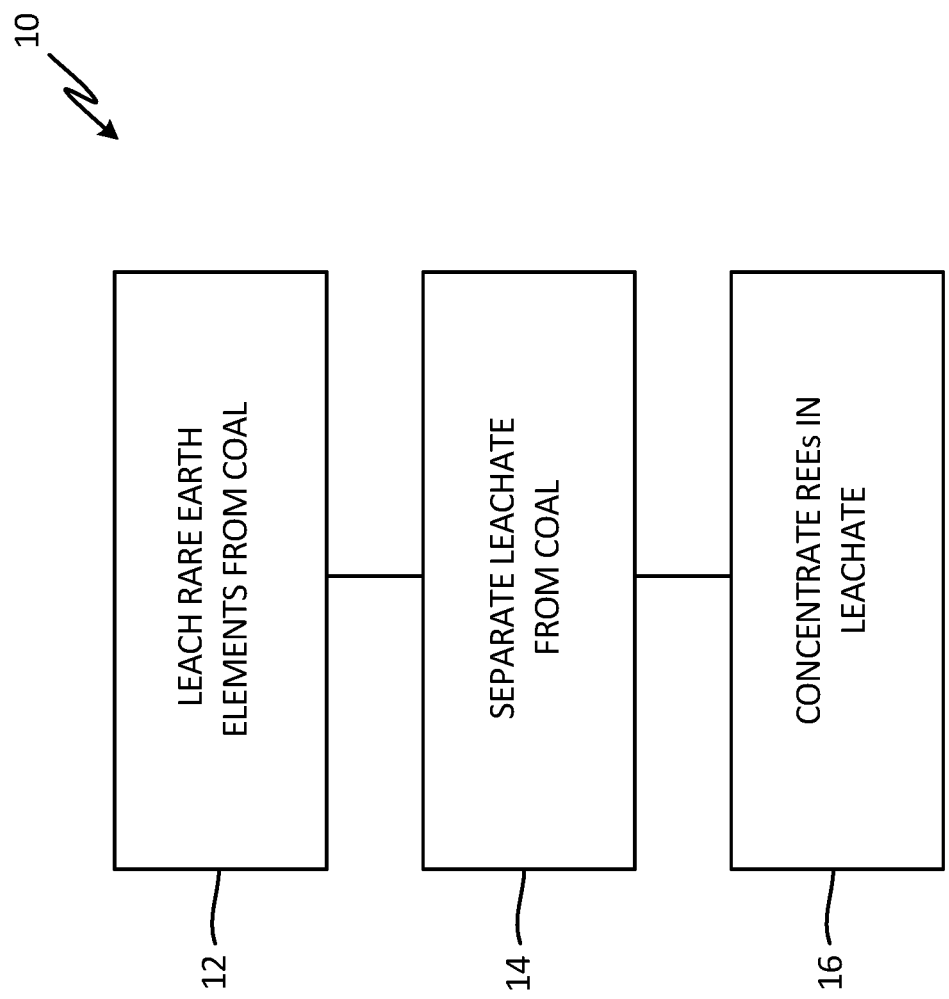
FIG. 1 is a flow diagram illustrating one method for extracting rare earth elements from coal.

FIG. 1 illustrates a flow diagram of one method for extracting REEs from a coal feedstock. As described in greater detail herein, method 10 includes extraction/leaching step 12, separation step 14, and concentration step 16. No treatment of the coal (i.e. drying, cleaning, washing) is necessary to prepare the coal for extraction of REEs. Some grinding of the coal to about 10 mesh or smaller may be needed, depending on the size of the selected/delivered coal.

Rare earth elements are leached from coal by contacting the coal with an acidic solution in leaching step 12. Rare earth elements present in the coal are extracted from the coal as they dissolve or become suspended in the acidic solution or otherwise move from the coal to the solution. The acidic solution is typically a dilute acid solution. Concentrated acids used in other coal beneficiation processes, such as concentrated hydrofluoric acid (HF), are not required to extract REEs. In some embodiments, the acidic solution is a dilute solution of hydrochloric acid (HCl), phosphoric acid ($H_3PO_4$), sulfuric acid ($H_2SO_4$), halogen oxoacids (e.g., hypochlorous acid, chloric acid, perchloric acid, etc.), nitric acid ($HNO_3$), carbonic acid ($H_2CO_3$), carboxylic acids (e.g., acetic acid, citric acid, formic acid, etc.) or a combination of any of the above. The acid or acids present in the acidic solution can have a molarity between 0.1M and 5M, a molarity between 0.2M and 2M, a molarity between 0.2M and 1M, or a molarity between 0.4M and 0.6M. In more specific embodiments, the acidic solution is 0.5M HCl, 0.5M $H_2SO_4$ or 0.5M $H_3PO_4$.

The coal can be contacted with the acidic solution by placing the coal in a vessel, such as a tank, and adding the acidic solution to the vessel. Agitation, mixing or stirring can be provided to ensure the acidic solution contacts as much surface area of the coal as possible. Heap leaching can also be used, in which the acidic solution is contacted with a storage pile of coal, and the percolated solution is recirculated via a containment vessel and pumps. No agitation is used in this configuration. In some embodiments, the weight:weight ratio of acidic solution to dry coal is between about 4:1 and about 0.5:1. In one particular embodiment, the weight:weight ratio of acidic solution to coal is about 2:1. Additional acidic solution (or a basic solution) can be added to the vessel over time to maintain a desired pH within the vessel and/or to facilitate more complete extraction of the REEs from the coal.

The acidic solution can contact the coal at a wide range of low temperatures. High temperatures are not necessary to leach REEs from the coal. In some embodiments, the acidic solution and coal are kept at a temperature between about 20° C. and about 100° C. The temperature can also be between about 20° C. and about 70° C., or between about 30° C. and about 55° C. In one particular embodiment, the acidic solution and coal are maintained at a temperature of about 40° C.

The acidic solution generally contacts the coal for a period of time up to about 60 hours. The longer the duration of contact between the acidic solution and the coal, the greater the amount of REEs that dissolve in the acidic solution. At a point, however, diminishing returns are observed once the majority of available REEs have been leached from the coal. In one lab test, the pH of the acidic solution was measured before and during contact with the coal. The pH of the acidic solution/coal mixture changed during the first 30 minutes of contact. After 30 minutes elapsed, the pH remained constant for the next 23 hours and 30 minutes. This pH observation suggests that substantially all REEs (and other coal components) migrate from the solid coal to the solution within about 30 minutes. In some embodiments, the acidic solution contacts the coal for between about 1 hour and about 60 hours. The contact duration can also be between about 12 hours and about 48 hours. In one particular embodiment, the acidic solution contacts the coal for about 24 hours.

In addition to REEs, other elements, compounds and particulates from the coal can dissolve or become suspended in the acidic solution as it contacts the coal. For example, the following elements are often present in coal feedstocks having a high concentration of REEs (>300 ppm): sodium, magnesium, aluminum, silicon, phosphorous, sulfur, chlorine, potassium, calcium, iron and barium. Other high value elements are also often present in coal; these include: cobalt, copper, gallium, germanium, nickel, vanadium, thorium and uranium. Each of these elements, and/or compounds containing these elements, can also leach from the coal to the acidic solution (or become suspended in the acidic solution) along with the REEs.

Additionally, the inorganic content of the coal can be reduced by the acidic solution. Inorganic content can be extracted into the acidic solution, thereby reducing the ash content of the coal produced after leaching. Reducing the ash content of the coal can have beneficial effects for subsequent coal processing. For example, it has been found that contacting coal with the acidic solution as described herein, can reduce the fly ash content of the coal when it is combusted by 70% compared to untreated coal. Additionally, since the organic content of the coal is preserved during leaching, the heating value of the residual coal, on a mass basis, is increased proportionally to the percentage of inorganic content extracted.

Following the step of contacting the coal with the acidic solution, the acidic solution can contain REEs at a concentration of about 10,000-20,000 ppm or 1-2% by weight.

After the coal is contacted with the acidic solution for the desired length of time (e.g., 30 minutes to 48 hours), the residual coal and the acidic solution (leachate) are separated in separation step 14. As the coal remains a solid and the leachate is a liquid, the residual coal and leachate are easily separated according to customary separation techniques, such as thickening, filtration or sieving.

Once the leachate (acidic solution) has been separated from the residual coal, the leachate can be further processed to form a concentrated REE solution (or mixture) in one or more concentration steps 16. Concentration step 16 can occur at the same site as leaching step 12 and separation step 14. Alternatively, the leachate can be transported off-site for concentration step 16. Concentration step 16 can include neutralization of the leachate, selective precipitation of iron or other impurities and their removal from the leachate and a combination of these steps. Neutralization of the leachate can be performed by adding an amount of hydroxide ion ($OH^-$) equivalent to the hydronium ion ($H_3O^+$) present in the leachate. Suitable sources of hydroxide ions include sodium hydroxide, potassium hydroxide, and calcium hydroxide. Other bases can also be used to neutralize the leachate. In one embodiment, no concentration steps are required after leaching, as the concentrations of REEs in the acidic leachate solution are sufficient for direct purification processing.

Selective precipitation and subsequent removal of iron is accomplished by an oxidation step in one embodiment of concentration step 16. An oxidizing agent is added to the leachate. The oxidizing agent reacts with iron present in the leachate to form iron oxides ($FeO$, $Fe_2O_3$, etc.), which are insoluble in the aqueous based leachate. The iron oxides can then be removed from the leachate via customary separation techniques, such as settling or filtration.

Concentration step 16 can also include other standard hydrometallurgy processes with the goal of obtaining a concentrated REE solution/mixture that contains at least 2% REEs by weight. Some hydrometallurgy processes, such as selective extractions using oxalic acid or other REE extractants or precipitating reagents, can separate the REEs from the acidic solution so that the acidic solution can be reused in the process to leach additional REEs from a new coal feedstock. In some embodiments, about 60% of the acidic solution can be recovered and used to contact another quantity of coal. The acidic solution may also be recovered/recycled if an optional purification step is carried out at the same location as leaching step 12, separation step 14 and concentration step 16. In this case the barren liquor resulting after removal of all of the target elements/compounds still contains about 60% of the original acid content, and can be recycled to leaching step 12.

Other elements and compounds having high value can be removed from the leachate in concentration step 16 to further concentrate the REEs in the leachate. These elements and compounds can include: cobalt, copper, gallium, germanium, nickel, vanadium, thorium and uranium. Finally, individual REEs or combinations of REEs are removed from the leachate and purified in one or more REE removal and purification steps, if necessary, so that they can be used in other processes and/or materials. The REEs can be removed from the leachate before or after the other high value target elements, depending on the hydrometallurgy methods used.

In another embodiment of a method for extracting REEs from a coal feedstock, leaching step 12 includes an additional leaching stage that is completed before leaching with the acidic solution. Prior to the acidic solution leach, the coal is contacted with an ion exchange solution, such as ammonium acetate. A small fraction of the REEs are leached from the coal into the ion exchange (e.g., ammonium acetate) solution along with a larger fraction of the alkali, alkaline earth and transition metal elements contained in the feed coal. The ammonium acetate leach can be performed at the same conditions (molarity, weight ratio, temperature, period of time) as those for the acidic solution. The ammonium acetate leachate is separated from the coal in similar fashion to the acidic solution. Once the ammonium acetate leachate has been removed, the residual coal, with decreased inorganic content but still high REE content, can be contacted with the acidic solution to recover the majority of REEs. Placing the ammonium acetate leach step before the acid leach step can increase the concentration of REEs in the acid leachate by rejection of impurities that would have been extracted with REEs during acid leaching. The ammonium acetate leachate can be combined with the acidic solution leachate or processed separately to recover the REEs or other target elements from the ammonium acetate leachate. In some embodiments, the coal is leached with water before or after the ammonium acetate leach. In one particular embodiment, coal is sequentially leached with water, 1M ammonium acetate and 1M HCl. Additionally, ammonium sulfate and other inorganic salt solutions can be used in place of ammonium acetate.

Figure 2:
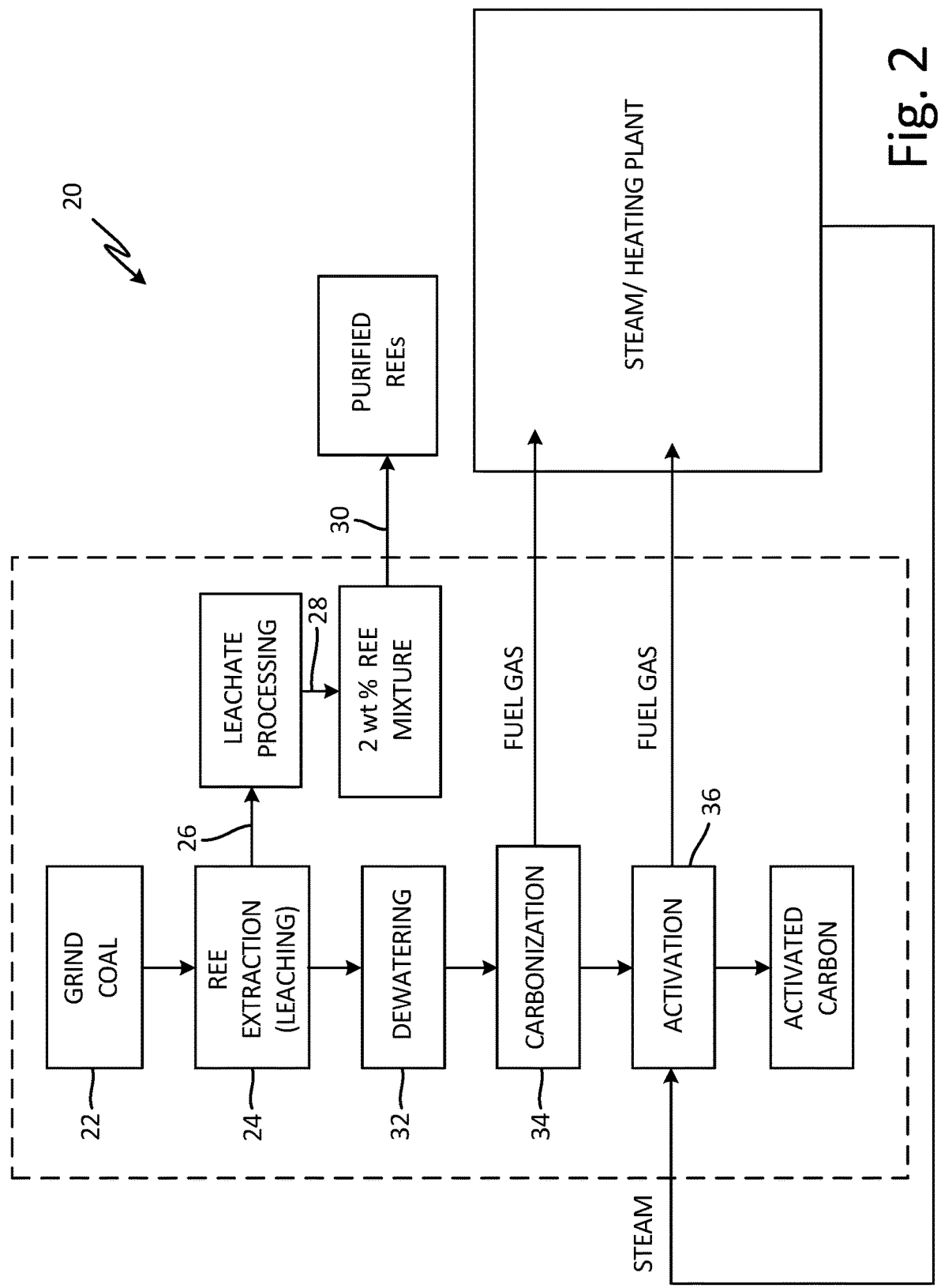
FIG. 2 is a flow diagram illustrating a method for extracting rare earth elements from coal integrated with an activated carbon production and steam generation process.

FIG. 2 illustrates a flow diagram of another method for extracting REEs from a coal feedstock. In this method, REE extraction is integrated with an activated carbon production process, such as that disclosed in U.S. Pat. No. 7,981,835. Method 20 contains the steps of method 10 in addition to other steps for the production of activated carbon from the residual coal.

Prior to extracting the REEs, the coal is ground, milled, crushed or cut to a desired particle size in grinding step 22. Grinding step 22 can be used where a particular size of coal is desired for further coal processing (e.g., producing activated carbon). In this particular embodiment, the coal is ground to the approximate size of that desired for the activated carbon.

Leaching step 24 and separation step 26 are the same as leaching step 12 and separation step 14 described above. The leachate is concentrated in concentration step 28, which is the same as concentration step 16 described above. Concentration step 28 produces a concentrated REE solution/mixture that contains at least 2% REEs by weight. The concentrated REE solution/mixture is then sent to purification step 30, where individual REEs are removed from the solution/mixture and purified according to hydrometallurgy methods.

Meanwhile, the residual coal is partially or completely dried in dewatering step 32. At this point, the residual coal has a significantly reduced inorganic (ash) content as much of the ash was removed by the acidic solution/leachate. Next, the dried coal is carbonized to form a char in carbonization step 34. The char is then activated with steam to produce activated carbon in activation step 36. Gases created in carbonization step 34 and activation step 36 are hydrogen-rich. As shown in FIG. 2, these gases are sent to a steam plant or combined heat and power plant and combusted (with or without other fuels) to make steam. A small portion of this steam is used in activation step 36 to produce the activated carbon. The remainder of the steam can be used for generating electric power, heating or other industrial uses. Thus, in addition to creating a concentrated REE solution/mixture, method 20 also produces activated carbon and fuel gases ($H_2$).

While the methods described above have focused on contacting coal with dilute acidic solutions, it is expected that contacting the coal with dilute basic solutions will also extract REEs from the coal. Concentrated bases used in some other coal beneficiation processes, such as molten caustics, are not required to extract REEs. In some embodiments, the basic solution is a dilute solution of an alkali metal hydroxide (e.g., sodium hydroxide, potassium hydroxide, etc.) an alkaline earth metal hydroxide (e.g., magnesium hydroxide, calcium hydroxide, etc.), an alkali metal or alkaline earth metal carbonate (e.g., sodium carbonate ($Na_2CO_3$), potassium carbonate ($K_2CO_3$), etc.) or a combination of any of the above. The leach using basic solutions can be performed at the same conditions (molarity, weight ratio, temperature, period of time) as those for the acidic solutions described herein. Neutralization of the leachate can be performed by adding an amount of hydronium ion ($H_3O^+$) equivalent to the hydroxide ion (Off) present in the leachate.

EXAMPLES

Example 1

Extraction of REEs from a sample of North Dakota lignite coal was performed. An elemental analysis of untreated coal was performed by inductively coupled plasma mass spectrometry to determine REE and target element content. Results of the elemental analysis are shown in Table 1.

Extraction/leaching was performed by adding 125 mL of 0.5M $H_2SO_4$ to 60 g of coal feedstock. Extraction/leaching was allowed to take place for 48 hours at an average temperature of 40° C. Following the extraction/leaching step, the residual coal and the leachate were separated. The residual coal was dried and an elemental analysis of the "leached" coal was performed. Results of this elemental analysis are also shown in Table 1. Combined with the mass of the starting and leached coal, the extraction for each of the elements was determined by difference in the untreated vs. leached coal.

TABLE 1

North Dakota Coal Feedstock

| Element | Untreated Coal (ppm) | Leached Coal (ppm) | Extracted to Leachate (%) |
| --- | --- | --- | --- |
| Sc | 36.33 | 7.16 | 82.5 |
| Y | 45.59 | 6.15 | 88.0 |
| La | 63.30 | 9.56 | 86.6 |
| Ce | 176.44 | 21.63 | 89.1 |
| Pr | 26.59 | 3.20 | 89.3 |
| Nd | 121.88 | 14.85 | 89.2 |
| Sm | 29.32 | 3.59 | 89.1 |
| Eu | 6.55 | 0.78 | 89.3 |
| Gd | 22.28 | 2.59 | 89.7 |
| Tb | 2.98 | 0.34 | 90.0 |
| Dy | 14.94 | 1.69 | 89.9 |
| Ho | 2.51 | 0.29 | 89.6 |
| Er | 6.38 | 0.79 | 89.1 |
| Tm | 0.85 | 0.11 | 88.7 |
| Yb | 5.38 | 0.72 | 88.2 |
| Lu | 0.74 | 0.10 | 87.7 |
| Co | 865 | 20.60 | 97.9 |
| Cu | 172 | 126.00 | 34.9 |
| Ga | 23.8 | 6.30 | 76.5 |
| Ge | 28.0 | 9.10 | 71.1 |
| Ni | 75.4 | 6.00 | 92.9 |
| V | 616 | 122.00 | 82.4 |
| Th | 29.9 | 6.90 | 79.5 |
| U | 16.3 | 4.60 | 74.9 |

These results show that extraction of REEs from the coal using 0.5M $H_2SO_4$ recovered approximately 90% of the REEs initially present in the coal.

Example 2

Extractions of REEs from the same coal feedstock in Example 1 were performed. The weight percent of REEs in leachates was evaluated after the leaching step. Trial A was conducted using a single leaching step with 0.5M $H_2SO_4$ with the same conditions as Example 1. The Trial A leachate contained 0.88% REEs by weight on a dry basis. Trial B was conducted using a leaching step with 1M ammonium acetate followed by a leaching step with 0.5M $H_2SO_4$. Trial B conditions (contact time and temperature) were the same for both the ammonium acetate and sulfuric acid leach steps and the same as used in Example 1. The Trial B leachate contained 1.01% REEs by weight on a dry basis.

An expected range of iron precipitation efficiency using oxidation methods is between 72% and 90%. Based on this efficiency range and a 5% REE loss during the iron precipitation process, concentrations of the Trial A and Trial B leachates following iron precipitation can be estimated. For example, at 72% iron precipitation efficiency (and 5% REE loss), the Trial A leachate would be expected to contain 1.94% REEs by weight on a dry basis. At 90% iron precipitation efficiency (and 5% REE loss), the Trial A leachate would be expected to contain 2.91% REEs by weight on a dry basis. At 72% and 90% iron precipitation efficiency (with 5% REE loss), the Trial B leachate would be expected to contain 2.94% and 6.07% REEs by weight on a dry basis, respectively.

Based on the above Examples and assuming a dry coal feed rate of about 1715 kilograms (kg) per hour (3780 pounds per hour), the amount of REEs extracted from the coal feedstock would be equivalent to about 20.4 kg per day (45 pounds per day) on a pure elemental basis.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
contacting a coal feedstock with an acidic solution to form a residual coal and a leachate; and
separating the residual coal from the leachate, wherein the leachate contains rare earth elements, and wherein the residual coal has preserved organic content and reduced inorganic content such that an ash content of the residual coal will be reduced during combustion.

2. The method of claim 1, further comprising:
neutralizing the leachate.

3. The method of claim 1, wherein the acidic solution comprises an acid selected from the group consisting of HCl, $H_3PO_4$, $H_2SO_4$, $HNO_3$, $H_2CO_3$, carboxylic acids, halogen oxoacids and combinations thereof.

4. The method of claim 1, wherein the acidic solution comprises an acid at a molarity between 0.1M and 5M.

5. The method of claim 1, further comprising:
contacting the coal feedstock with ammonium acetate or other ion exchange solution prior to contacting the coal feedstock with the acidic solution.

6. The method of claim 5, further comprising:
contacting the coal feedstock with water prior to or after contacting the coal feedstock with the ammonium acetate.

7. The method of claim 1, wherein the coal feedstock is contacted with the acidic solution for a period of time between about 1 hour and about 60 hours at a temperature between about 20° C. and about 70° C.

8. The method of claim 7, wherein the coal feedstock is contacted with the acidic solution for a period of time between about 12 hours and about 48 hours at a temperature between about 30° C. and about 50° C.

9. The method of claim 1, wherein the coal feedstock is selected from the group consisting of brown coal, lignite, leonardite, sub-bituminous coal and combinations thereof.

10. The method of claim 9, wherein the coal feedstock is selected from the group consisting of Hagel B feedstock, Hansen feedstock, Harmon feedstock, Beulah feedstock, Zap feedstock and combinations thereof.

11. The method of claim 1, further comprising:
removing rare earth elements from the leachate.

12. The method of claim 1, further comprising:
selectively precipitating iron contained within the leachate; and
removing iron precipitate from the leachate.

13. The method of claim 12, wherein the leachate contains at least 2% rare earth elements by weight.

14. The method of claim 1, wherein the coal feedstock is contacted with the acidic solution at a ratio between about 0.5:1 and about 1:4 by weight.

15. The method of claim 14, wherein the coal feedstock is contacted with the acidic solution at a ratio of about 1:2 by weight.

16. The method of claim 11, further comprising:
removing at least one of Co, Cu, Ga, Ge, Ni, V, Th and U from the leachate.

17. The method of claim 5, wherein the ammonium acetate removes a portion of alkali, alkaline earth, and transition metal elements from the coal feedstock to form an ammonium acetate leachate, and further comprising separating the ammonium acetate leachate from the coal feedstock.

18. The method of claim 1, wherein the coal feedstock is contacted with the acidic solution for a period of time that is less than 1 hour at a temperature between about 20° C. and about 70° C.

19. A method comprising:
contacting a coal feedstock with ammonium acetate or other ion exchange solution;
contacting the coal feedstock with an acidic solution to form a residual coal and a leachate; and
separating the residual coal from the leachate, wherein the leachate contains rare earth elements, and wherein the residual coal has preserved organic content and reduced inorganic content such that an ash content of the residual coal will be reduced during combustion.

20. The method of claim 19, wherein the ammonium acetate removes a portion of alkali, alkaline earth, and transition metal elements from the coal feedstock to form an ammonium acetate leachate, and further comprising separating the ammonium acetate leachate from the coal feedstock.

* * * * *

UNITED STATES PATENT AND TRADEMARK OFFICE
CERTIFICATE OF CORRECTION

PATENT NO. : 10,669,610 B2
APPLICATION NO. : 15/462164
DATED : June 2, 2020
INVENTOR(S) : Laudal et al.

Page 1 of 1

It is certified that error appears in the above-identified patent and that said Letters Patent is hereby corrected as shown below:

In the Specification

Column 1, Line 3, Insert:
--This invention was made with government support under DE-EE0027006 awarded by the United States Department of Energy. The government has certain rights in the invention.--

Signed and Sealed this
Nineteenth Day of January, 2021

Andrei Iancu
*Director of the United States Patent and Trademark Office*